W. D. STROWGER.
Cultivator.
No. 38,066.  Patented Mar. 31, 1863.
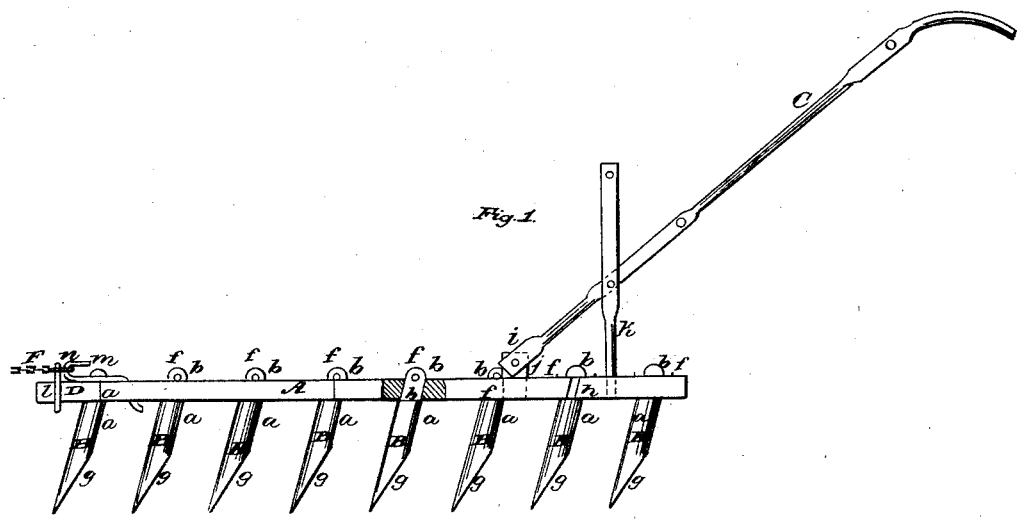
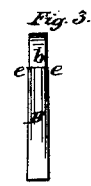
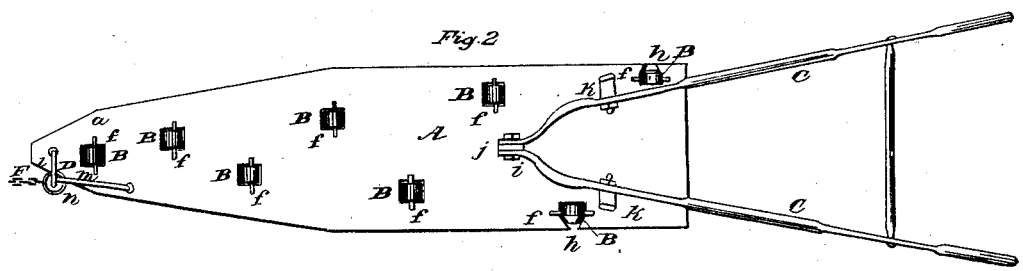
Witnesses
J W Coombs
G W Reed
Inventor
William D Strowger
per Munn & Co
Attys

UNITED STATES PATENT OFFICE.

WILLIAM D. STROWGER, OF OSWEGO, NEW YORK.

IMPROVEMENT IN SUBSOILING IMPLEMENTS.

Specification forming part of Letters Patent No. 38,066, dated March 31, 1863.

*To all whom it may concern:*

Be it known that I, WILLIAM D. STROWGER, of Oswego, in the county of Oswego and State of New York, have invented a new and Improved Implement or Device for Loosening the Soil and Disengaging Stones therefrom, and which implement or device I term a "Subsoiling and Ditching Machine;" and I do hereby declare that the following is a full, clear, and exact description of the same, reference being had to the accompanying drawings, making a part of this specification, in which—

Figure 1 is a side view of my invention; Fig. 2, a plan or top view of the same; Fig. 3, a detached front view of a tooth pertaining to the same.

Similar letters of reference indicate corresponding parts in the several figures.

The object of this invention is to obtain an implement of simple construction which may be advantageously used for loosening stiff soils which cannot be operated upon by an ordinary plow, and also used for disengaging stone on the surface of the ground, as well as for loosening the subsoil, ditching, &c.

The invention consists in the employment or use of a solid metal plate having oblique holes in it for the insertion of teeth of a proper form, and having handles attached to it, all being arranged, as hereinafter fully shown and described, to effect the desired end.

To enable those skilled in the art to fully understand and construct my invention, I will proceed to describe it.

A represents a plate, which may be of cast-iron and of any suitable dimensions. For ordinary purposes the plate should be about two (2) inches thick, four (4) feet in length, one (1) foot in width at its back part, said width being equal for about two and a half ($2\frac{1}{2}$) feet, the plate then tapering toward its front end, which is about six (6) inches in width at the point $a$, and then has a quicker taper to its extreme end. (See Fig. 2.) The plate A has oblique holes made in it to receive teeth B, which are of cylindrical or rectangular form at their upper parts, $a$. These teeth are made narrow at their upper ends, as shown at $b$, so as to form shoulders $e$, which bear against the under side of the plate, or the plate A rests upon them, the holes in the plate being of such dimensions that the narrow upper ends of the teeth project a short distance above the plate A, and have keys or pins $f$ passing through them. The lower parts of the teeth B are made of taper form by beveling their back surfaces, as shown at $g$, the front surfaces being perfectly straight. The lower parts of the teeth are of rectangular form in their transverse section, and the lower ends of the teeth have square sharp edges similar to a dirt-pick, for the teeth are of equal width throughout, the sharp edges being formed by the beveled surfaces $g$. The teeth are placed in two rows, one near each side of the plate A; but the teeth of each row are not in line with each other, they being set gradually inward or toward the center of the plate from the back toward the front end of the latter, as shown in Fig. 2. The two extreme back teeth, B, may be fitted in dovetail notches $h\ h$, made one in each side of plate A. This arrangement admits of said teeth being quite near the sides of the plate. The teeth may be constructed wholly of steel; or they may be constructed of iron and have steel points welded on them. The teeth of one row are also in line with the centers of the spaces between the other row.

C C represent two handles, which may be either of iron or wood, and of the same shape as an ordinary plow or cultivator handle. The lower ends of these handles are secured by a bolt, $i$, to a short upright, $j$, on the plate A. The handles are braced or secured in proper position by upright bars $k\ k$, attached to the plate A, the handles being bolted to said bars.

D represents the clevis, which is formed of a ring, $l$, fitted centrally in the front end of the plate A, and a hook, $m$, which is fitted in the plate just back of the ring $l$ and near one side of the former. The ring $n$ of the draft-chain $f$ is fitted on the ring $l$ of the clevis, and when it is desired to have the draft at one side of the implement the hook $m$ is fitted in the ring $n$ of the draft-chain, as shown in Figs. 1 and 2, and when a central draft is required the hook $m$ is removed or detached from the ring $n$ of the draft-chain.

The advantage of this implement consists in its immense strength and durability and its capacity for acting efficiently upon the soil. The plate A, being weighty, causes the teeth B to penetrate hard, stiff soils and thoroughly pulverize the same, and also causes the teeth to engage firmly with stones and pull out or loosen the same as the implement is drawn along. It will also act in the most efficient manner for subsoiling and also for ditching, as the hard strata of earth below the surface can be rendered friable and loosened without any difficulty whatever.

Having thus described my invention, what I claim as new, and desire to secure by Letters Patent, is—

An implement for subsoiling, ditching, &c., composed of a solid metal plate, A, and teeth B, the latter being fitted in the former, substantially as shown, and the plate provided with handles C C and a clevis, B, all being constructed and arranged as herein set forth.

WILLIAM D. STROWGER.

Witnesses:
R. F. CHILD,
ROBERT SCOTT.